United States Patent [19]

Davis

[11] 4,300,537
[45] Nov. 17, 1981

[54] SOLAR PANEL MOUNT

[76] Inventor: Thomas A. Davis, 1657 Gotham St., Chula Vista, Calif. 92010

[21] Appl. No.: 188,705

[22] Filed: Sep. 19, 1980

[51] Int. Cl.³ .............................................. F24J 3/02
[52] U.S. Cl. .................................. 126/437; 126/424; 126/438
[58] Field of Search ............... 126/451, 443, 424, 425, 126/450, 435, 436, 400, 419; 165/DIG. 4

[56] References Cited

U.S. PATENT DOCUMENTS 3,934,573  1/1976  Dandini .............................. 126/443
4,010,614  3/1977  Arthur ................................. 126/425
4,136,674  1/1979  Korr ................................... 126/443
4,187,831  2/1980  Eubank .............................. 126/435

Primary Examiner—James C. Yeung
Attorney, Agent, or Firm—Brown & Martin

[57] ABSTRACT

A solar collector mounting system includes a vertically extending pedestal for supporting a solar collector at a predetermined minimum height above ground level to provide an unobstructed utilization of the space immediately surrounding the pedestal. The pedestal includes a pivoting bracket at the upper end for supporting an array of panels for orientation into the sun, and is formed of a hollow structure to define a liquid storage reservoir for storing a heated liquid.

5 Claims, 4 Drawing Figures

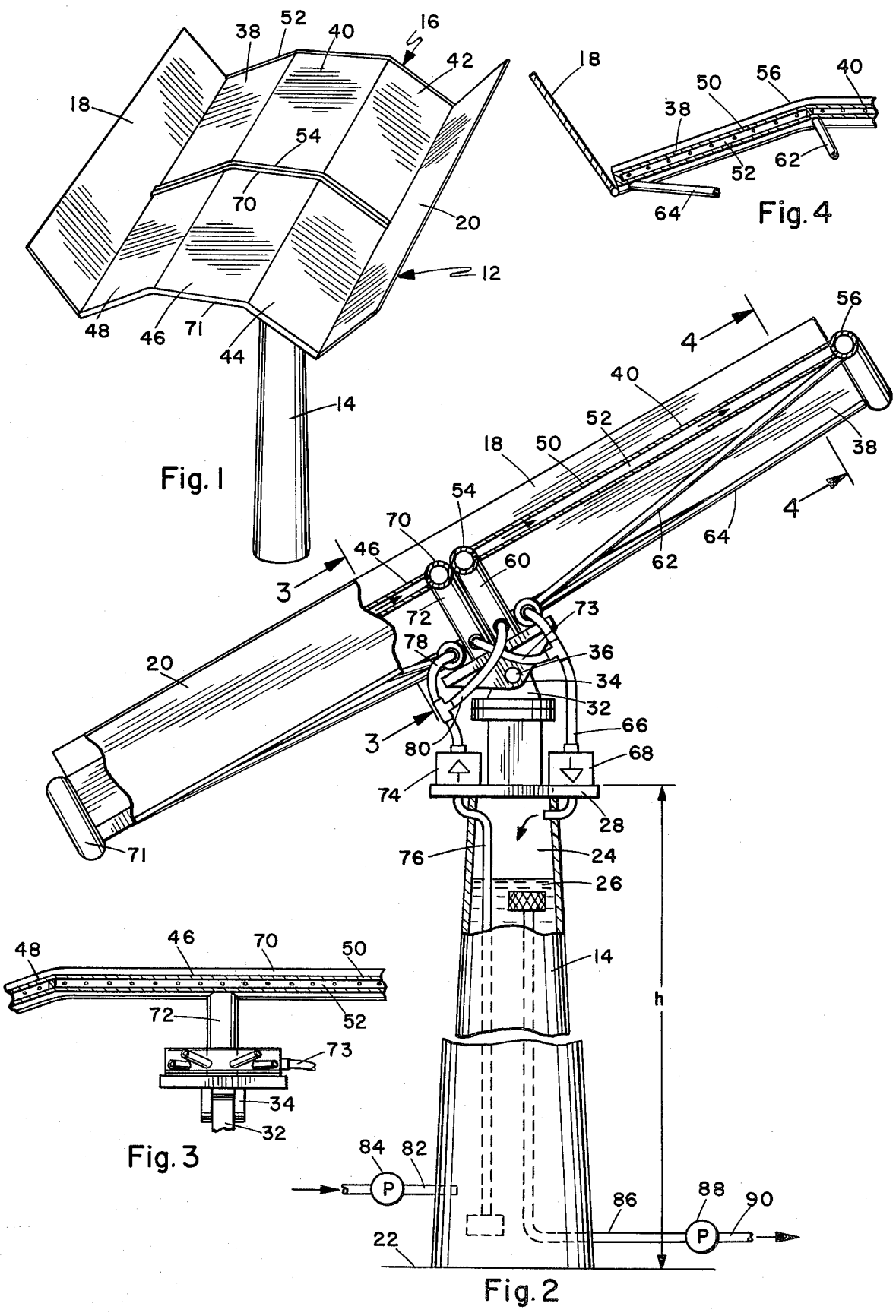

SOLAR PANEL MOUNT

BACKGROUND OF THE INVENTION

The present invention relates to solar energy and pertains particularly to a mounting for solar collector panels.

The use of flat plate solar collectors has been increasing at a fairly rapid rate in recent years. This increase in the use of solar collectors is primarily due to the increase in cost and the scarcity of formerly cheap and abundant fossil fuels.

One drawback to the use of solar collectors is that a minimum area of exposure is needed for the collection of usable amounts of solar energy. Typically, solar collectors are mounted on rooftops of buildings and the like, and in vacant land areas on racks or the like. Many proposals have been made to build or construct solar collection farms in desert areas and the like, where the land is not normally otherwise useful.

The present invention is directed toward a structure that permits the mounting of usable quantities of solar collectors in park areas and in areas surrounding building structures without obstructing and permitting the normal utilization of the ground area.

SUMMARY AND OBJECTS OF THE INVENTION

It is primary the object of the present invention to provide an improved solar collector mounting structure.

In accordance with the primary aspect of the present invention a solar collector mounting assembly includes a vertically extending column anchored at its lower end in the ground or to suitable structure on the ground and having a bracket at the upper end for tiltably supporting a solar collector. Another aspect of the invention includes the construction of the column to define a storage reservoir for heated liquid circulated through the solar collection panels.

BRIEF DESCRIPTION OF THE DRAWINGS

The above and other objects and advantages of the invention will become apparent from the following description when read in conjunction with the drawings, wherein:

FIG. 1 is a perspective view of the solar panel and mounting pedestal.

FIG. 2 is an enlarged side elevation view of the structure with portions cut away.

FIG. 3 is a sectional view taken on line 3—3 of FIG. 2.

FIG. 4 is a sectional view taken on line 4—4 of FIG. 2.

DETAILED DESCRIPTION OF A PREFERRED EMBODIMENT

Turning to FIG. 1 of the drawings there is illustrated an array of discrete solar collection panels mounted on the upper end of a pedestal. In the illustrated embodiment the combination designated generally by the numeral 12 includes a vertically extending, cylindrical pedestal 14 having an array of panels 16 mounted on the upper end thereof. The pedestal can take any suitable form such as circular, square, or the like, and preferably has a height sufficient to position the solar collector array 16 at sufficient height each above the immediately surrounding terrain such that utilization of that space is unobstructed. The lower end of the pedestal 14 is securely mounted in the ground or to suitable base structure in ground and the solar collector array is mounted on the upper end thereof and oriented into the predominant direction of the sun.

The array of panels can extend or be sufficiently above the surrounding terrain at a height h of from 8 to 18 feet, such that the array can be mounted in parks and the like without interfering with the usual utilization thereof. The typical length or height of the column should be around 11 or 12 feet. Such structures, for example, can provide shading or other roof-like structures over park benches, picnic tables, and the like. A number of the units can be, for example, located and arranged throughout a public park or the like and interconnected for the supplying of heated water to public buildings and the like.

The units can also be mounted along streets and thoroughfares such as boulevards or the like, and interconneced to provide heated water to nearby homes and other buildings. The height of the lower edge of the solar collector array above the ground surface can be adjusted to be suitable or compatable with a surrounding area.

It is contemplated that this structure can support an array of from 4 to 6 fairly large, flat plate panels. These panels can be, for example, on the order of approximately 4×8 feet each and an array extending approximately 12×16 feet in area. In mounting the panels as illustrated with the center panels essentially flat and the side panels sloping as illustrated in FIG. 1, a pair of side reflectors 18 and 20 may be desirable in order to reflect the sun's rays onto the panel which is least directly exposed to the sun at the particular time. For example, the illustrated arrangement includes mirrors or reflector panels that reflect sun onto the panels on the opposite side of the array from the sun for optimum early morning and late afternoon exposure of these panels.

Turning to FIG. 2, the pedestal 14 anchors or is secured at the lower end into the ground or base support structure 22 in a suitable manner. The pedestal comprises basically an elongated, vertically extending, hollow or tubular column defining a storage reservoir or chamber 24 in which a liquid 26 such as water or other suitable liquid is stored. A reasonable size column or pedestal can store on the order of about 145 cubic feet or 1085 gallons of water. The column 14 includes a platform or the like 28 at the upper end on which is mounted a bracket including a base member 30 and a swivel or rotatable member 32 which is mounted for rotation about a vertical axis on the member 30. This permits the array of panels to be selectively oriented to the optimum direction of the sun. In addition, proper slewing drive means may be provided for tracking the sun.

The bracket includes an upper pivot member 34 which is pivoted by means of a pin 36 to the member 32 for permitting the array of panels to pivot about a horizontal axis.

The array 16 as illustrated in FIG. 1, of solar collectors consists of a plurality of discrete flat plate collector panels 38, 40, 42, 44, 46 and 48 mounted in a suitable framework in support structure not specifically disclosed and interconnected for providing a flow of fluid to be heated therethrough.

Turning back to FIG. 2, the panel 40 is shown in section and includes a flat collector plate 50 having a fluid flow channel 52 extending therealong and connected or communicating with manifolds 54 and 56 at the opposite ends thereof. A transparent window of glass or the like, not shown, could cover the plate and define what is typically referred to as a glazed panel. This would provide a greenhouse effect for maximizing the transfer of heat to the fluid in the channel. In the preferred arrangement the manifolds of these panels will be interconnected and a common inlet flow line or conduit 60 suplies fluid to the manifold 54, and the fluid such as water than flows along the channel 52 to the upper manifold 56 and returns by way of one or more return lines 62 and 64 to the reservoir of the system. These lines return to a common collection point or the like 68 to the reservoir 24.

The lower set of panels 44, 46, and 48 are similarly constructed and interconnected to manifolds 70 and 71 at the upper and lower ends thereof for returning fluid or water by way of a conduit 72 and line 73 to the return line 66 and reservoir.

A supply pump 74 draws fluid or water by way of a conduit or line 76 extending to the bottom of the reservoir and supplies it by way of supply lines 78 and 80 to the upper and lower sets of panels. These supply and return lines 78, 80 and return lines 66, 74 are preferably flexible lines that permit the tilting of the array of panels with respect to the support pedestal without damage to the lines.

Makeup or feed water may be supplied to the system by way of a conduit 82 and supply pump 84 from a source of cold water or from recirculating through a heating system or the like. Water for the heating system or other use is supplied by means of an outlet or supply line 86 which draws hot water from the reservoir preferably at the top thereof and supplies it by means of a pump 88 by way of a supply line 90. The reservoir or column structure 19 can be constructed of any suitable material such as iron, steel, fiberglass, aluminum or concrete with suitable reinforcement. In addition, the column or pedestal structure is preferably insulated (not shown) to maintain the heat within the system.

Thus, while I have illustrated and described my invention by means of specific embodiments it is to be understood that numerous changes and modifications may be made therein without departing from the spirit and scope of the invention as defined in the appended claims.

I claim:

1. A solar collector system, said system comprising in combination:
   a vertically extending supporting column formed by a tubular member defining a liquid storage reservoir having an upper end, and a lower end for anchoring to a support surface and a height of at least 8 feet,
   a mounting bracket on the upper end of said column for mounting a solar collector for at least limited adjustment in orientation toward the sun;
   said column having a length in relation to a solar collector mounted thereon for positioning the lowermost portion of the solar collector at a predetermined minimum height to provide unobstructed utilization of the immediate area surrounding the column;
   a flat plate liquid circulating collector mounted on said column, and
   circulating means for circulating a liquid from said reservoir through said collector.

2. The mounting pedestal of claim 1, comprising the combination of:
   an array of discrete liquid circulating flat plate solar collector panels mounted on said pedestal; and
   circulating means for circulating a liquid through said panels.

3. The combination of claim 2, including a side reflector mounted on each side of said array for reflecting sun rays onto said collectors.

4. The combination of claim 3 wherein said panels within said array are mounted at angles to adjacent panels.

5. The combination of claim 1 wherein said circulating means includes a pump and means for drawing said liquid from the bottom of said reservoir and returning it to the top of said reservoir.

* * * * *